United States Patent [19]

Mairson

[11] 4,188,816

[45] Feb. 19, 1980

[54] APPARATUS AND METHOD FOR PERFORMING INERTIAL MEASUREMENTS USING TRANSLATIONAL ACCELERATION TRANSDUCERS AND FOR CALIBRATING TRANSLATIONAL ACCELERATION TRANSDUCERS

[75] Inventor: Theodore Mairson, Lexington, Mass.

[73] Assignee: Sanders Associates, Inc., Nashua, N.H.

[21] Appl. No.: 711,770

[22] Filed: Aug. 5, 1976

Related U.S. Application Data

[63] Continuation of Ser. No. 528,243, Nov. 29, 1974, abandoned.

[51] Int. Cl.² ............................................ G01L 25/00
[52] U.S. Cl. .................................. 73/1 D; 73/517 R; 73/488
[58] Field of Search ............. 73/1 D, 1 DC, 488, 510, 73/511, 512, 504, 516 R, 517 R

[56] References Cited

U.S. PATENT DOCUMENTS

| | | | |
|---|---|---|---|
| 2,788,654 | 4/1957 | Wiancko et al. | 73/1 DC |
| 3,015,946 | 1/1962 | Moore | 73/1 D |
| 3,071,975 | 1/1963 | Hurt | 73/517 R |
| 3,470,730 | 10/1969 | Fujitsubo et al. | 73/1 DC |

Primary Examiner—Richard E. Aegerter
Assistant Examiner—Willis Little
Attorney, Agent, or Firm—Louis Etlinger; Richard I. Seligman

[57] ABSTRACT

Inertial measurements, including the measurement of angular velocity as well as angular and translational acceleration, are made by spinning one or more translational acceleration transducers disposed at predetermined positions and orientations and combining their output signals. The principles of the invention are also applied to generate components of translational acceleration for the purpose of calibrating translational acceleration transducers.

39 Claims, 13 Drawing Figures

APPARATUS AND METHOD FOR PERFORMING INERTIAL MEASUREMENTS USING TRANSLATIONAL ACCELERATION TRANSDUCERS AND FOR CALIBRATING TRANSLATIONAL ACCELERATION TRANSDUCERS

This is a continuation of application Ser. No. 528,243 filed Nov. 29, 1974, now abandoned.

BACKGROUND OF THE INVENTION

Presently gyroscopes are used in many arrangements, such as inertial platforms and the like, for the measurement of angular velocity. In such arrangements separate gyroscopic instruments are usually used to measure each component of angular velocity. These gyroscopic arrangements are inherently costly and relatively large. Gyroscopes operate by storing a large angular momentum using a flywheel, thus further contributing to their relatively large size. Since the heavy flywheel must be critically balanced, the cost thereof is further increased.

Gyroscopes are further limited in that they cannot withstand a rugged environment because of their relatively delicate bearing and pickoff alignment. For example, I will describe hereinafter apparatus for measuring angular velocity in pitch and yaw of a gun-fired spinning projectile on which such apparatus is mounted. The apparatus undergoes translational acceleration of 20,000 or more g's while being fired from a gun and experiences a large centrifugal acceleration during the measurement due to the spinning of the projectile. This centrifugal acceleration component imposed on such apparatus increases in proportion to the distance away from the spin-axis of the projectile on which the apparatus is mounted and would be very large since space limitations would preclude placing the apparatus near the spin-axis. This centrifugal acceleration can reach 7000 g's on parts of the apparatus which are one inch away from the spin-axis. Furthermore, the gyroscope's angular mounting tolerances would have to be impractically precise.

As in the spinning projectile application two gyroscopes would usually be required, their combines size further precludes their use. Accordingly, another type of rate sensor is required.

Another problem related to kinematics is the calibrating of translational acceleration transducers. Currently, there are four principal methods of calibrating such transducers. These are: (1) static calibration in a centrifuge, (2) calibration versus frequency by rotation in the earth's gravitational field, (3) calibration versus amplitude and frequency on a "shake table" with a precalibrated transducer and (4) calibration versus amplitude and frequency on a "shake table" employing an optical interferometer.

Method (1) is unsatisfactory since it does not provide a dynamic calibration. Method (2), of course, is severely limited because calibrations can only be made up to the ±1 g of the earth's gravitational forces and admixes cross-axis sensitivity in varying proportion. Method (3), which is a comparison test performed on a shake table, is accurate to only about 1%, due to practical limitations of current art and, furthermore, this method does not permit the user to locate the physical center of action of the instrument under test. Method (4) is quite cumbersome and is not suitable for routine application.

SUMMARY OF THE INVENTION

Accordingly, it is an object of this invention to provide improved apparatus for making inertial measurements.

It is a further object of this invention to provide apparatus for measuring the motions of a rigid body by using translational acceleration transducers.

It is yet another object of this invention to provide apparatus for measuring angular velocity which apparatus is relatively low in cost, small in size and rugged.

It is still further object of this invention to provide apparatus for measuring both pitch and yaw rates by a single apparatus.

It is a further object of this invention to provide apparatus for measuring angular velocity and angular and translational acceleration by means of an array of one or more translational acceleration transducers disposed at predetermined positions and orientations.

It is yet another object of this invention to provide apparatus for measuring translational acceleration, angular acceleration and angular rate separately.

It is still another object of this invention to provide apparatus for dynamically calibrating translational acceleration transducers.

It is yet a further object of this invention to provide apparatus for calibrating translational acceleration transducers using laboratory equipment to generate accurate accelerations at various frequencies by combinations of precisely controlled spin and yaw rate inputs.

It is also an object of this invention to provide improved apparatus for measuring angular velocities of a spinning body about axes perpendicular to the spin axis.

Briefly, this invention teaches how the problems discussed can be solved by measuring the accelerations at a point and combining the measured outputs. This technique can provide measures of angular velocity as well as angular and translational acceleration. The measurements depend on the kinematics of a point in a moving rigid body and do not depend on stored angular momentum, as does a gyroscope. The measurements do not require new motion transducers, but can employ various kinds of translational acceleration transducers, including that class of devices which are known as "linear accelerometers".

These have not been used heretofore to measure angular velocity. Also, the kinematic principles employed in the measurement can be used in a converse manner to generate precise linear accelerations for the purpose of calibrating translational acceleration transducers, thus enhancing the level output of these devices.

In one embodiment, measurement of angular velocity is achieved by spinning a translational acceleration transducer about an axis, the transducer being disposed so that its sensitive axis is parallel to and offset from the spin-axis. The output from the transducer is a sinusoid having a frequency equal to the spin frequency and having an amplitude proportional to the angular velocity about an axis normal to the spin-axis and a phase proportional to the angle that the axis reaches with respect to a reference direction in inertial space.

In another embodiment separate measurements of translational acceleration, angular accelerational and angular velocity are achieved by spinning an array of such transducers about an axis.

In a further embodiment of the invention a translational acceleration transducer is calibrated by spinning such transducer at a predetermined rate about one axis and rotating it at a predetermined rate about a second axis which is perpendicular to the first, whereby the spin and rotation rates generate a predetermined linear acceleration which is measured by the transducer under test.

This invention is based on the measurement and/or generation of components of translational accelerations at one or more points in a rigid body. The devices which perform these measurements can be any of a large class of devices which are capable of measuring translational acceleration. The output signals of these devices may be any of a large class of signals, including electrical voltages and/or currents, mechanical displacements, hydraulic pressure or flow, etc. The invention consists of the positioning and orientation of one or more translational acceleration transducers in a rigid body so that the transducers generate signals which can be processed to yield inertial measurements, which have heretofore required equipment which is larger, more expensive and less rugged. The invention also consists of the positioning and orientation of one or more translational acceleration transducers in a calibration device which is capable of generating components of translational acceleration which are known accurately and which can be used for calibrating the transducers which have been positioned and oriented on the device.

This invention is valid and independent of the following:

(1) the kind of translational acceleration transducer employed,
(2) the nature of the output signals generated by the transducers,
(3) the manner of combining the output signals of the transducers, when more than one is employed, and
(4) the manner of processing the output signals of the transducers or the combined signals.

BRIEF DESCRIPTION OF THE DRAWINGS

The above-mentioned and other features and objects of this invention will become more apparent by reference to the following description taken in conjunction with the accompanying drawings, in which:

FIG. 8 is a drawing partly in section illustrating the adding of additional transducers to the face-plate of the embodiment of FIGS. 3A–3C and means for tilting said embodiment.

DESCRIPTION OF PREFERRED EMBODIMENTS

The translational acceleration at a point in a moving rigid body depends on the motion of the body and of the coordinates of the point in the body. These relationships can be used in measuring the motions of a rigid body by means of translational acceleration transducers or in calibrating such transducers by means of the motions of rigid bodies.

In accordance with the principles of this invention translational acceleration transducers are mounted and oriented in a rigid body so that they generate significant output signals. These signals are operated on so that undesired effects are suppressed and desired effects are accentuated. Two general approaches to these matteers are identified which are quite independent of the kind of translational acceleration transducer employed. These approaches have been called the Algebraic Method and the Trigonometric Method.

The Algebraic Method and the Trigonometric Method provide a theoretical basis for embodiments of the invention. Such embodiments include a device for calibrating translational acceleration transducers, a class of devices for generalized inertial measurements on vehicles such as airplanes, ships and the like and a class of devices for generalized inertial measurements on spinning bodies, such as artillery projectiles.

The generalized inertial measurements include the measurement of angular velocity as well as angular and translational acceleration. Heretofore, the measurement of angular velocity has required stored angular momentum, as in gyroscopes. The measurement of angular velocity described here depends only on kinematic effects and the sensing of translational acceleration at one or more points in a rigid body and does not require stored angular momentum.

Figure 1:
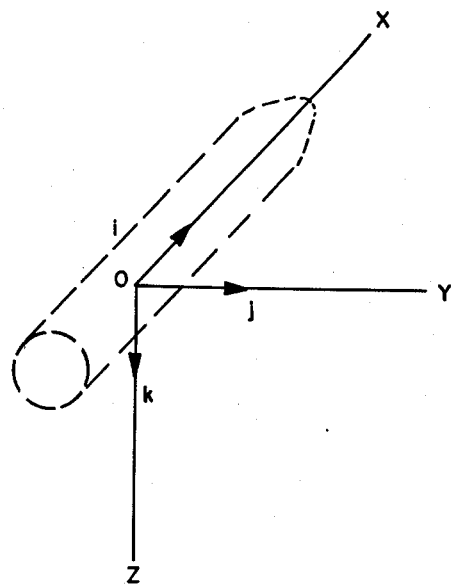
FIG. 1 is a diagram illustrating the coordinate conventions employed in the discussion of the invention.

The motion of a rigid body can be described by three vectors resolved onto a coordinate frame fixed in that body. In FIG. 1, i, j and k are unit vectors in the X, Y and Z directions of a right-handed cartesian coordinate frame. The three vectors are:

(1) a translational acceleration vector, $\bar{A}_o$, associated with the origin, whose components are $a_o$, $b_o$, $c_o$. Thus, $$\bar{A}_o = i\, a_o + j\, b_o + k\, c_o \qquad (1)$$

(2) an angular velocity vector, $\bar{\Omega}$, whose components are p, q, r. Thus, $$\bar{\Omega} = i\, p + j\, q + k\, r \qquad (2)$$

(3) an angular acceleration vector, $\dot{\bar{\Omega}}$, whose components are $\dot{p}$, $\dot{q}$, $\dot{r}$. Thus $$\dot{\bar{\Omega}} = i\, \dot{p} + j\, \dot{q} + k\, \dot{r} \qquad (3)$$

Generalized inertial measurement implies the measurement of the nine components: $a_o$, $b_o$, $c_o$, p, q, r, $\dot{p}$, $\dot{q}$, $\dot{r}$.

Note that the translational acceleration vector, $\bar{A}_o$, is associated with a particular point in the rigid body, whereas the angular velocity vector, $\bar{\Omega}$, and the angular acceleration vector, $\dot{\bar{\Omega}}$, are associated with the entire rigid body.

The concept which is developed here is that the measurement of the nine components enumerated above can be accomplished by measuring translational acceleration components, $a_i$, $b_i$, $c_i$ at coordinates $x_i$, $y_i$, $z_i$. However, a translational acceleration transducer will measure only one of the three components (i.e., $a_i$, $b_i$ or $c_i$) or a single resultant of the three. In particular, the measurement of translational acceleration components suffices to measure angular velocity.

The acceleration at a point in a moving coordinate frame has been given by L. Page, "Introduction to Theoretical Physics" D. Van Nostrand, Inc., New York, 1961.

$$\bar{A}_i = \bar{A}_o + \bar{\Omega} \times (\bar{\Omega} \times \bar{R}_i) + \dot{\bar{\Omega}} \times \bar{R}_i \qquad (4)$$

where $\bar{A}_o$ and $\bar{\Omega}$ are given by equations (1) and (2) and where $$\bar{R}_i = x_i + j\, y_i + k\, z_i \qquad (5)$$

$\bar{R}_i$ being the position vector of a point in the coordinate frame. The vector cross products in equation (4) are $$\bar{\Omega} \times \bar{R}_i = \begin{vmatrix} i & j & k \\ p & q & r \\ x_i & y_i & z_i \end{vmatrix} \qquad (6)$$

$$= i(z_i q - y_i r) + j(x_i r - z_i p) + k(y_i p - x_i q)$$

$$\bar{\Omega} \times (\bar{\Omega} \times \bar{R}_i) = \begin{vmatrix} i & j & k \\ p & q & r \\ z_i q - y_i r & x_i r - z_i p & y_i p - x_i q \end{vmatrix} \qquad (7)$$

$$= i(y_i pq - x_i q^2 - x_i r^2 + z_i pr)$$
$$+ j(z_i rq - y_i r^2 - y_i p^2 + x_i qp)$$
$$+ k(x_i rp - z_i p^2 - z_i q^2 + y_i rq)$$

$$\dot{\bar{\Omega}} \times \bar{R}_i = \begin{vmatrix} i & k & k \\ \dot{p} & \dot{q} & \dot{r} \\ x_i & y_i & z_i \end{vmatrix}$$

$$= i(z_i \dot{q} - y_i \dot{r}) + j(x_i \dot{r} - z_i \dot{p}) + k(y_i \dot{p} - x_i \dot{q}) \qquad (8)$$

Collecting terms in equations (1), (6), (7) and (8) and expressing the results in matrix form gives $$\begin{bmatrix} a_i \\ b_i \\ c_i \end{bmatrix} = \begin{bmatrix} a_o \\ b_o \\ c_o \end{bmatrix} + \begin{bmatrix} -(q^2 + r^2) & pq - \dot{r} & pr + \dot{q} \\ pq + \dot{r} & -(p^2 + r^2) & rq - \dot{p} \\ pr - \dot{q} & rq + \dot{p} & -(p^2 + q^2) \end{bmatrix} \begin{bmatrix} x_i \\ y_i \\ z_i \end{bmatrix} \qquad (9)$$

where $a_i$, $b_i$ and $c_i$ are components of the translational acceleration of a point and a $x_i$, $y_i$ and $z_i$ are the coordinates of the point. Equation (9) agrees with a similar expression given by A. G. Webster, "The Dynamics of Particles and of Rigid, Elastical Fluid Bodies", Hafner Publishing Company, Inc., New York, 1949.

However, not all the terms in this matrix equation are of the same importance in current art and practice. The terms which are most familiar are those due to translational acceleration of the origin and those which result from treating p, q and r as small quantities and ignoring their products and powers. The matrix equation which results from this usual engineering treatment is $$\begin{bmatrix} a_i \\ b_i \\ c_i \end{bmatrix} = \begin{bmatrix} a_o \\ b_o \\ c_o \end{bmatrix} + \begin{bmatrix} 0 & -\dot{r} & \dot{q} \\ \dot{r} & 0 & -\dot{p} \\ -\dot{q} & \dot{p} & 0 \end{bmatrix} \begin{bmatrix} x_i \\ y_i \\ z_i \end{bmatrix} \qquad (10)$$

This equation is applied frequently in measuring the translational acceleration at a point which is not conveniently accessible (for example, the center-of-gravity of an airplane engine).

The terms which are next in familiarity are the centrifugal terms, which involve the squares of p, q, and r. The matrix equation containing only these terms is:

$$\begin{bmatrix} a_i \\ b_i \\ c_i \end{bmatrix} = \begin{bmatrix} -(r^2 + q^2) & 0 & 0 \\ 0 & -(p^2 + r^2) & 0 \\ 0 & 0 & -(p^2 + q^2) \end{bmatrix} \begin{bmatrix} x_i \\ y_i \\ z_i \end{bmatrix} \qquad (11)$$

However, this equation affords some practical difficulties because the coefficients are sums of squares.

The least familiar terms are those which involve the products of the angular velocities, i.e., pq, qr, and rp. The matric equation containing only these terms is:

$$\begin{bmatrix} a_i \\ b_i \\ c_i \end{bmatrix} = \begin{bmatrix} 0 & pq & pr \\ pq & 0 & qr \\ pr & qr & 0 \end{bmatrix} \begin{bmatrix} x_i \\ y_i \\ z_i \end{bmatrix} \qquad (12)$$

It is these terms which provide a basis for measuring angular velocity by means of measuring translational acceleration. The basis along with the more familiar terms can provide a means for making generalized inertial measurements by measuring translational accelerations.

The generalized measurements require means for generating desired effects and suppressing undesired ones. Two general methods for realizing these capabilities have been identified. They have been called the Algebraic Method and the Trigonometric Method and they are described below. They can be employed singly or in combination.

The most direct method of generating the desired effects is to mount translational acceleration transducers in a rigid body and to described the motion of the rigid body, the coordinates of the points at which the transducers are mounted and the translational accelerations at these points. These descriptions are all resolved onto a single coordinate frame which is fixed in the body. The signals from the transducers, so mounted, can then be combined to isolate desired signals and suppress undesired effects.

THE ALGEBRAIC METHOD

The algebraic method can be described in terms of pairs of acceleration transducers, but its application is not restricted to pairs, and a generalization will be described later.

A pair of transducers can be mounted in a rigid body. The orientations of each member of the pair are identical as are two out of three position coordinates. The third position coordinates are equal in absolute magnitude, but opposite in sign. The output signals from the two transducers are subtracted. For example, let transducers Number One and Number Two be oriented to measure the translational acceleration component, a. Let their position coordinates be $$x_1 = x \quad x_2 = x \quad (13)$$
$$y_1 = y \quad y_2 = y$$
$$z_1 = +\Delta_{12} \quad z_2 = +\Delta_{12}$$

then $$a_1 = a_o - (q^2 + r^2)x + (pq - \dot{r})y + (pr + \dot{q})\Delta_{12} \quad (14)$$

$$a_2 = a_o - (q^2 + r^2)x + (pq - \dot{r})y - (pr + \dot{q})\Delta_{12} \quad (15)$$

Consider that the desired effect is the product, pr, and that the other effects are unwanted and are to be suppressed. Subtracting:

$$a_1 - a_2 = 2\Delta_{12}(pr + \dot{q}); \; pr + \dot{q} = \frac{a_1 - a_2}{2\Delta_{12}} \quad (16)$$

In like manner, a pair of transducers can be oriented to measure translational acceleration component c and located at the following position coordinates $$x_3 = \Delta_{34} \quad x_4 = -\Delta_{34} \quad (17)$$
$$y_3 = y \quad y_4 = y$$
$$z_3 = z \quad z_4 = z$$

then $$c_3 = c_o + (pr - \dot{q})\Delta_{34} + (rq + \dot{p})y - (p^2 + q^2)z \quad (18)$$

$$c_4 = c_o - (pr - \dot{q})\Delta_{34} + (rq + \dot{p})y - (p^2 + q^2)z \quad (19)$$

and $$c_3 - c_4 = 2\Delta_{34}(pr - \dot{q}); \; pr - \dot{q} = \frac{c_3 - c_4}{2\Delta_{34}} \quad (20)$$

Also, $$pr = \frac{a_1 - a_2}{4\Delta_{12}} + \frac{c_3 - c_4}{4\Delta_{34}} \quad (21)$$

$$\dot{q} = \frac{a_1 - a_2}{4\Delta_{12}} - \frac{c_3 - c_4}{4\Delta_{34}} \quad (22)$$

This scheme can be extended to provide measures of the terms qr, pg, $\dot{r}$ and $\dot{p}$.

The translational accelerations at the origin can be measured by placing transducers at the origin to measure the translational acceleration components, a, b, c. This approach is mathematically correct, but physically impractical since physical transducers cannot occupy the same position. A practical approach is to employ pairs of transducers, properly oriented and positioned so that two out of three position coordinates are zero, the third coordinates are nonzero. Thus, if $$x_1 = 0 \quad x_2 = 0 \quad (23)$$
$$y_1 = 0 \quad y_2 = 0$$
$$z_1 = \Delta_1 \quad z_2 = \Delta_2$$

$$a_1 = a_o + (pr + \dot{q})\Delta_1 \quad (24)$$

$$a_2 = a_o + (pr + \dot{q})\Delta_2 \quad (25)$$

Solving for $a_o$ and $pr + \dot{q}$:

$$a_o = \frac{a_1 \Delta_2 - a_2 \Delta_1}{\Delta_1 - \Delta_2} \quad (26)$$

$$pr + \dot{q} = \frac{a_1 - a_2}{\Delta_1 - \Delta_2} \quad (27)$$

in like manner, if $$x_3 = \Delta_3 \quad x_4 = \Delta_4 \quad (28)$$
$$y_3 = 0 \quad y_4 = 0$$
$$z_3 = 0 \quad z_4 = 0$$

Then $$c_3 = c_o + (pr - \dot{q})\Delta_3 \quad (29)$$

$$c_4 = c_o + (pr - \dot{q})\Delta_4 \quad (30)$$

Solving for $c_o$ and $pr - \dot{q}$ $$c_o = \frac{c_3 \Delta_4 - c_4 \Delta_3}{\Delta_3 - \Delta_4} \quad (31)$$

$$pr - \dot{q} = \frac{c_3 - c_4}{\Delta_3 - \Delta_4} \quad (32)$$

Finally $$pr = \frac{1}{2}\left[\frac{a_1 - a_2}{\Delta_1 - \Delta_2} + \frac{c_3 - c_4}{\Delta_3 - \Delta_4}\right] \quad (33)$$

$$\dot{q} = \frac{1}{2}\left[\frac{a_1 - a_2}{\Delta_1 - \Delta_2} + \frac{c_3 - c_4}{\Delta_3 - \Delta_4}\right] \quad (34)$$

The scheme can be extended to measure $b_o$ as well as qr, pq, $\dot{p}$ and $\dot{r}$.

Note that the theory for the Algebraic Method implies transducers whose 20 output signals are proportional to a component of translational acceleration along a line through a point. Existing transducers approximate these characteristics, but it is not clear at this writing how precise these approximations can be. The matter of calibration and errors is discussed later.

To summarize:
(1) The Algebraic Method describes the motion of a rigid body and the acceleration at a point in that body as well as the coordinates of each point in terms of a single coordinate frame, fixed in the body.
(2) The Algebraic Method isolates signals proportional to pq, qr, rp, $\dot{p}$, $\dot{q}$, $\dot{r}$, $a_o$, $b_o$, $c_o$ by placing translational acceleration transducers in an array in the rigid body and combining their output signals.
(3) Placing transducers in an array in a rigid body implies:
  (a) mounting each transducer at predetermined position coordinates
  (b) orienting each transducer so that its sensitive axis is aligned along a preferred direction. The placement and combination techniques which have been described in detail involve only weighted sums and differences of a rather simple kind. However, it is obvious that more complex summations can be mathematically equivalent.

The Trigonometric Method

A less direct method is to mount translational acceleration transducers in a rigid body and to describe the coordinates of the points at which the transducers are mounted and the translational accelerations measured at these points with respect to a coordinate frame fixed in the body. However, the motions of the body are described with respect to a second coordinate frame, which will be described presently.

Let the unprimed coordinate frame already introduced be fixed in the body. This frame will be used to describe the coordinates of points in the body and the translational accelerations at these points.

An auxiliary coordinate frame (the primed coordinate frame) is introduced and the motions of the body are described with respect to this primed frame. These motions are $a_o'$, $b_o'$, $c_o'$, $p'$, $q'$, $r'$, $\dot{p}'$, $\dot{q}'$, $\dot{r}'$.

The auxiliary frame is selected so that its origin corresponds to that of the unprimed frame and one of its axes coincides with an axis of the unprimed frame. However, the angular velocities of the two frames about the coincident axes are independent of one another. It will be convenient to select the coincident axes - so that their symbols are equivalent (i.e., X and X', Y and Y' and Z and Z'). The discussion presented here will be in terms of coincident X and X' axes, but the argument is general and applies to the other possible choices as well.

Figure 2:
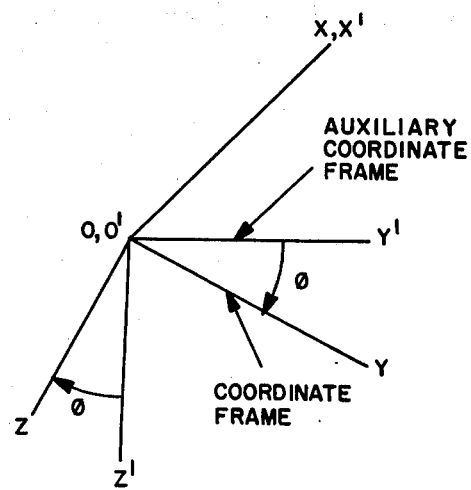
FIG. 2 is a diagram illustrating description of motion in an auxiliary coordinate frame.

The arrangement of the two coordinate frames is shown in FIG. 2. The origins of the two frames are coincident. So are the X and X' axes. However, the angular velocities of the two frames are not necessarily equal (i.e., p and p' are not necessarily equal) and a relative angular displacement, $\phi$, results. The magnitude of this angular displacement, $\phi$, is $$\phi = \phi(o) + \int_0^t (p - p')dt \; ; \; \dot{\phi} = p - p' \qquad (35)$$

The motion components, resolved onto the primed coordinate frame, can then be resolved onto the unprimed coordinate frame by means of the following transformations.

$$a_o = a_o' \qquad (36)$$
$$b_o = b_o' \cos \phi + c_o' \sin \phi$$

$$c_o = -b_o' \sin \phi + c_o' \cos \phi \qquad (37)$$
$$q = q' \cos \phi + r' \sin \phi$$

$$r = -q' \sin \phi + r' \cos \phi$$
$$\dot{q} = \dot{q}' \cos \phi + \dot{r}' \sin \phi + (p-p')(-q' \sin \phi + r' \cos \phi)$$
$$\dot{r} = -\dot{q}' \sin \phi + \dot{r}' \cos \phi + (p-p')(-q' \cos \phi - r' \sin \phi) \qquad (38)$$

These expressions can then be substituted into the equation for the translational acceleration derived previously. The result of this substitution is summarized in the table below:

| Acceleration Component | Acceleration At Origin | Coefficient of $x_i$ | Coefficient of $y_i$ | Coefficient of $z_i$ |
|---|---|---|---|---|
| $a_i$ | $a_o'$ | $-(q'^2 + r'^2)$ | $[(2p - p')q' - \dot{r}']\cos \phi + [(2p - p')r' + \dot{q}']\sin \phi$ | $-[(2p - p')q' - \dot{r}']\sin \phi + [(2p - p')r' + \dot{q}']\cos \phi$ |
| $b_i$ | $b_o' \cos \phi + c_o' \sin \phi$ | $(p'q' + \dot{r}')\cos\phi + (p'r' - \dot{q}')\sin\phi$ | $-(p^2 + \frac{q'^2 + r'^2}{2}) + \frac{q'^2 - r'^2}{2} \cos 2\phi + q'r' \sin 2\phi$ | $-\dot{p} + \frac{q'^2 - r'^2}{2} \sin 2\phi + q'r' \cos 2\phi$ |
| $c_i$ | $-b_o' \sin \phi + c_o' \cos \phi$ | $-(p'q' + \dot{r}')\sin\phi + (p'r' - \dot{q}')\cos\phi$ | $\dot{p} - \frac{q'^2 - r'^2}{2} \sin 2\phi + q'r' \cos 2\phi$ | $-(p^2 + \frac{q'^2 + r'^2}{2}) + \frac{q'^2 - r'^2}{2} \cos 2\phi - q'r' \sin 2\phi$ |

It is convenient to separate the terms of this table into three subsets:
 (1) terms which are independent of $\phi$
 (2) terms which contain sin $\phi$ and cos $\phi$
 (3) terms which contain sin $2\phi$ and cos $2\phi$
This has been done and the results are presented in equations (39), (40) and (41).

Terms independent of $\phi$ $$\begin{bmatrix} a_i \\ b_i \\ c_i \end{bmatrix} = \begin{bmatrix} a_o' \\ 0 \\ 0 \end{bmatrix} + \begin{bmatrix} -(q'^2 + r'^2) & 0 & 0 \\ 0 & -(p^2 + \frac{q'^2 + r'^2}{2}) & -\dot{p} \\ 0 & \dot{p} & -(p^2 + \frac{q'^2 + r'^2}{2}) \end{bmatrix} \begin{bmatrix} x_i \\ y_i \\ z_i \end{bmatrix} \qquad (39)$$

Terms containing sin $\phi$ and cos $\phi$ $$\begin{bmatrix} a_i \\ b_i \\ c_i \end{bmatrix} = \begin{bmatrix} 0 \\ b'\cos \phi + c_o' \sin \phi \\ -b'\sin \phi + c_o' \cos \phi \end{bmatrix} + \begin{bmatrix} 0 & [(2p - p')q' - \dot{r}']\cos \phi + [(2p - p')r' + \dot{q}']\sin \phi & -[(2p - p')q' - \dot{r}']\cos \phi + [(2p - p')r' + q']\cos \phi \\ (p'q' + \dot{r}')\cos \phi + (p'r' - \dot{q}')\sin \phi & 0 & 0 \\ -(p'q' + \dot{r}')\sin \phi + (p'r' - \dot{q}')\cos \phi & 0 & 0 \end{bmatrix} \begin{bmatrix} x_i \\ y_i \\ z_i \end{bmatrix} \qquad (40)$$

Terms containing sin $2 \phi$ and cos $2 \phi$

-continued $$\begin{bmatrix} a_i \\ b_i \\ c_i \end{bmatrix} = \begin{bmatrix} 0 & 0 & 0 \\ 0 & \frac{1}{2}(q'^2 - r'^2)\cos 2\phi + q'r'\sin 2\phi & -\frac{1}{2}(q'^2 - r'^2)\sin 2\phi + q'r'\cos 2\phi \\ 0 & -\frac{1}{2}(q'^2 - r'^2)\sin 2\phi + q'r'\cos 2\phi & -\frac{1}{2}(q'^2 - r'^2)\cos 2\phi - q'r'\sin 2\phi \end{bmatrix} \begin{bmatrix} x_i \\ y_i \\ z_i \end{bmatrix} \quad (41)$$

These equations are quite general and do not involve any simplifying approximations. They separate the dynamic effects in a manner quite different from that described in the Algebraic Method.

The separation of terms afforded by this Trigonometric Method (so called because of the role played by the angle $\phi$ and the sines and cosines of $\phi$ and $2\phi$) can be accentuated in the following manner (1) The angular velocity, p, is made large, much larger than q and r.
(2) The angular velocity, p', is made small so that p'→0.

Under these conditions the terms independent of $\phi$ become zero-frequency terms, those dependent on $\sin \phi$ and $\cos \phi$ become single frequency terms (of frequency $f = p/2\pi$), and those dependent on $\sin 2\phi$ and $\cos 2\phi$ become double frequency terms.

The effect of a large angular velocity, p, is to translate certain effects to the frequency $f = p/2\pi$ and to amplify the effects of the angular velocity components, q' and r', by a factor, 2p. The effects of the zero-frequency terms and the single frequency terms can be separated readily by well-known signal processing techniques. The effects of the double-frequency terms can be separated by signal processing techniques and, in many cases can be ignored as negligible second order effects.

The separation of the single-frequency terms from one another can be accomplished by the Algebraic Method already described.

To summarize:
(1) The Trigonometric Method describes the coordinates of points and the translational acceleration at these points in terms of a coordinate frame fixed in a moving rigid body (the unprimed coordinate frame).
(2) The Trigonometric Method describes the motion of the moving body in terms of an auxiliary coordinate frame (the primed coordinate frame).
(3) The origins of the primed and unprimed coordinate frames coincide. So do a pair of coordinate axes (one from each frame). However, the angular velocities about the coincident axes are not necessarily equal and a relative angular displacement, $\phi$, results.
(4) The translational accelerations at points in the body (unprimed coordinate frame) can be described by three sets of terms:
(i) terms independent of $\phi$ (zero-frequency terms)
(ii) terms containing $\sin \phi$ and $\cos \phi$ (single-frequency terms)
(iii) terms containing $\sin 2\phi$ and $\cos 2\phi$ (double-frequency terms)
(5) The zero-frequency, single-frequency and double-frequency terms can be separated from one another by well-known signal processing techniques. The single frequency terms can be separated from one another by the Algebraic Method.

An ideal translational transducer should have the following characteristics:

(1) It should have an origin which possesses the properties of a mathematical point.
(2) It should have a sensitive axis, which is a straight line, passing through its origin.
(3) Its sensitivity in physical units of output signal per physical unit of translational acceleration should be finite and constant in the direction of its sensitive axis and zero for all directions normal to the sensitize axis. An ideal transducer would be subject to the following errors in being applied in either the Algebraic Method or the Trigonometric Method.
(1) a position error, whose components are $\Delta x_i$, $\Delta y_i$, $\Delta z_i$
(2) an orientation error, due to angular rotations of its sensitive axes whose components are $d\phi_i$, $d\theta_i$, $d\psi_i$
(3) an uncertainty in its sensitivity of $\Delta k_i$. The effect of these errors on the generalized inertial measurements can be analyzed in a straightforward manner.

However, physical transducers do not have these ideal characteristics. Moreover, the state of the transducer art does not provide definitive data on the characteristics of physical transducers. This is due to limitations in the current art of calibrating transducers.

The equations developed above for the Trigonometric Method are applied to the design of a calibration device.

Figure 3C:
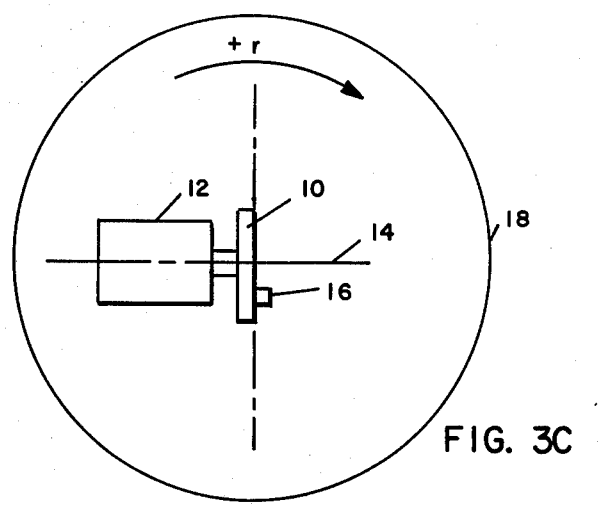
FIGS. 3A–3C are diagrams for illustrating apparatus for the calibration of translational acceleration transducers.
Figure 3A:
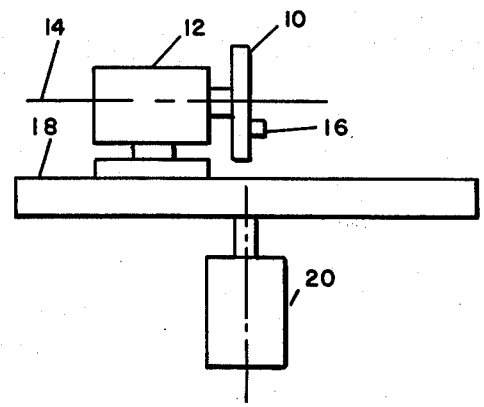
Figure 3B:
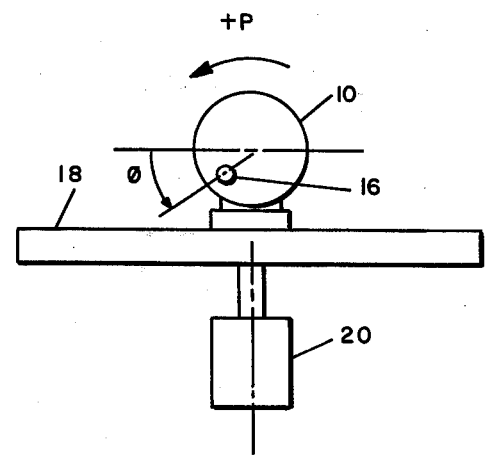

Referring now to FIGS. 3A–3C, there is illustrated thereby a device which can be used for generating oscillating linear acceleration components by means of angular velocities, and thus, employed in the calibration of translational acceleration transducers. The basic elements include a faceplate 10 which is mounted on a spin-motor 12 for rotation thereby. The plane of face-plate 10 is normal to the axis of rotation 14 of spin motor 12. The transducer 16 is mounted on face-plate 10 so that its sensitive axis is normal to face-plate 10 and parallel (but not coincident) to the axis of rotation 14 thereof. Commercial transducers such as translational accelerometers often hav a threaded fitting which can be mounted through a hole in the face-plate and fastened with a nut, any fastening means will suffice. The assembly, consisting of face-plate 10, spin-motor 12 and transducer 16, is mounted on a turntable 18, using bolts or other fasteners, which is rotated by a yaw-motor 20 which is supported by a frame (not shown). The rotation axis 14 or spin-motor 12 and the rotation axis of the turntable 20 intersect at an angle of 90°.

The primed coordinate frame of the previous discussion is associated with turntable 18. The Z'-axis coincides with the yaw-axis and the X'-axis coincides with the spin-axis.

The unprimed coordinate frame is associated with face-plate 10 and orthogonal Y and Z axes may be inscribed on the face-plate. The X axis coincides with the spin-axis.

The yaw axis lies in the plane of the face-plate and the origins of the two coordinate frames are coincident.

Transducer 16 is mounted on face-plate 10 at the following coordinates $$\left.\begin{matrix} x_i = 0 \\ y_i = 0 \\ z_i \neq 0 \end{matrix}\right\} \quad (42)$$

The following magnitudes are assigned to the dynamic variables $$\left.\begin{array}{l} \dot{p}' = \dot{q}' = \dot{r}' = \dot{p} = 0 \\ p \neq 0 \\ q' = 0 \\ r' \neq 0 \end{array}\right\} \begin{array}{l} a_o' = b_o' = 0 \\ c_o' \neq 0 \end{array} \quad (43)$$

In other words, spin-motor 12 spins at constant angular velocity, p, and yaw-motor 20 rotates at constant angular velocity, r'. Equations (39), (40), and (41) become:

TERMS INDEPENDENT OF $\phi$ $a_i = 0$ $b_i = 0$ $c_i = z_i(p^2 + r'^2/2)$  (44)

TERMS WHICH CONTAIN SIN $\phi$ and cos $\phi$ $a_i = 2\ pr'z_i \cos \phi$
$b_i = c_o' \sin \phi$
$c_i = c'_o \cos \phi$  (45)

TERMS WHICH CONTAIN SIN $2\phi$ and cos $2\phi$ $a_i = 0$
$b_i = \frac{1}{2} z_i r' \sin 2\phi$ $c_i = \frac{1}{2} z_i r' \cos 2\phi$  (46)

If transducer 16 is oriented with its sensitive axis normal to the faceplace, it will measure $a_i$, where $a_i = 2pr'z_i \cos \phi$  (47)

and this will be a sinusoidal signal with frequency equal to $p/2\pi$. Thus, the frequency can be controlled by setting the spin rate after which the amplitude of excitation can be controlled by setting r'. A typical magnitude of excitation which might be generated is $p = 1570\ \text{sec}^{-1} (15{,}000\ \text{RPM})$ $r' = 1.75\ \text{sec}^{-1} (100\ \text{deg/sec})$ $z_i = 1.0$ $2pr'z_i = 2 \times 1570 \times 1.75 \times 1/12 = 457.9\ \text{ft/sec}^2 = 14.22$ g's The entire assembly may be tilted to provide a different orientation with respect to gravity. In this Figure motor 20 has an extension 21 thereon which is mounted within a flange 23 fixed to a surface 25. The assembly is tilted by rotating extension 21 within flange 23. A set screw 27 is provided to fix the tilt position of the assembly.

FIG. 8 also illustrates the employment of plural transducers 16 on face-plate 10.

Figure 4B:
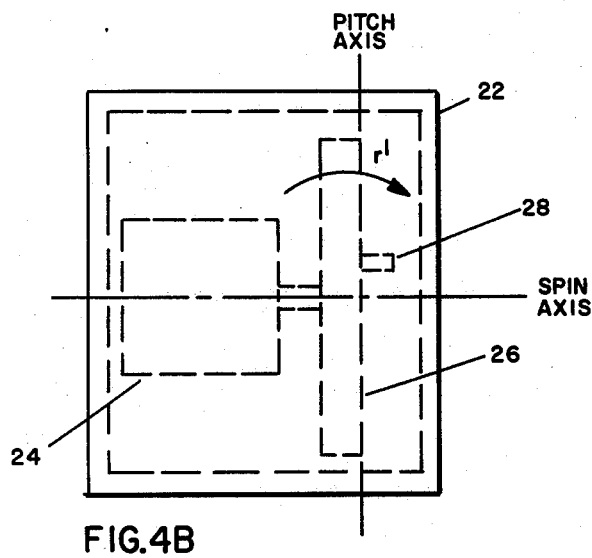
FIGS. 4A–4C are plan, top and side views, respectively, of apparatus for measuring angular velocity about two axes perpendicular to each other.
Figure 4A:
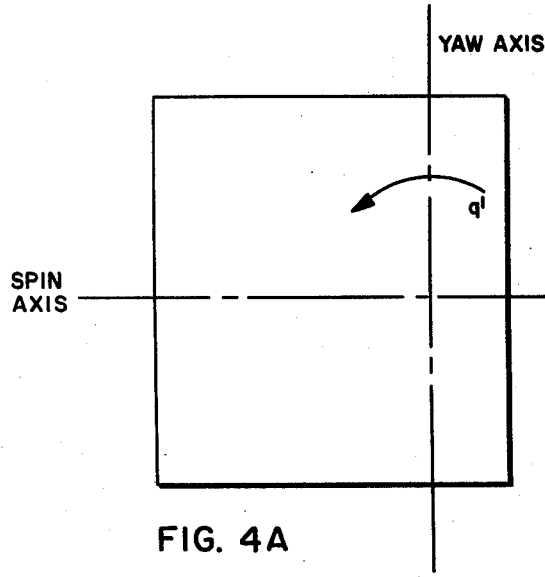
Figure 4C:
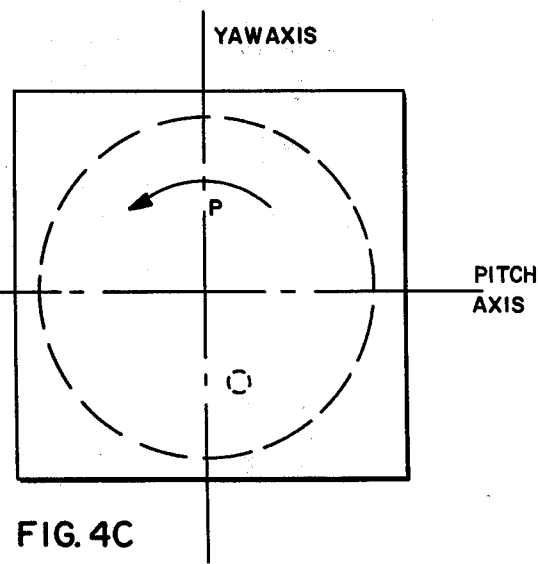

The principal employed in the calibration device shown in FIGS. 3A–3C can be applied in a device which gives an approximate measure of angular velocity. Such a device is illustrated in FIG. 4. It consists of a case 22 containing a spin-motor 24, a face-plate 26 and a translational acceleration transducer 28. The transducer is mounted on face-plate 26 with its sensitive axis normal to the face-plate.

If case 22 is turning at a constant angular velocity the measurement thereof will be exact. Only when the case is turning at an accelerated or decelerated rate will the measurement be approximate.

The primed coordinate frame is associated with the case and lines are inscribed on the case to indicate the location of the coordinate axes.

The unprimed coordinate frame is associated with the face-plate. The Y and Z axes may be inscribed on the face-plate and the X-axis coincides with the spin-axis.

The origins of the two coordinate frames are coincident.

The transducer is mounted on the face-plate at the following coordinates $x_i = 0$ $y_i = 0$ $z_i \neq 0$  (48)

and the spin-motor is rotated at constant speed so that $p - p' = \text{constant}$  (49)

The motions of the case are p', q', r', $\dot{p}'$, $\dot{q}'$, $\dot{r}'$, $a_o$, $b_o$, $c_o$.
The signal generated by the transducer is $a_i = a_o - z_i[(2p - p')q' - \dot{r}']\sin \phi + z_i[2p - p')r' + \dot{q}']\cos \phi$  (50)

when $2p >> p'$ and $\dot{r}' \approx 0$ and $\dot{q}' \approx 0$, this becomes $a_i = a_o + 2pz_i(-q' \sin \phi + r' \cos \phi)$  (51)

This signal contains a term which is independent of $\phi$ and terms which contain sin $\phi$ and cos $\phi$.

Thus, a single instrument consisting of a case, a spin-motor, a face-plate and a transducer can provide approximate measures of q' and r'.

There are many alternative methods of processing the output signals to separate the term independent of $\phi$ from the terms which contain sin $\phi$ and cos $\phi$. These will be obvious to those skilled in the art.

The approximations made in this instrument can be corrected in a manner which is described hereinafter.

Figure 5B:
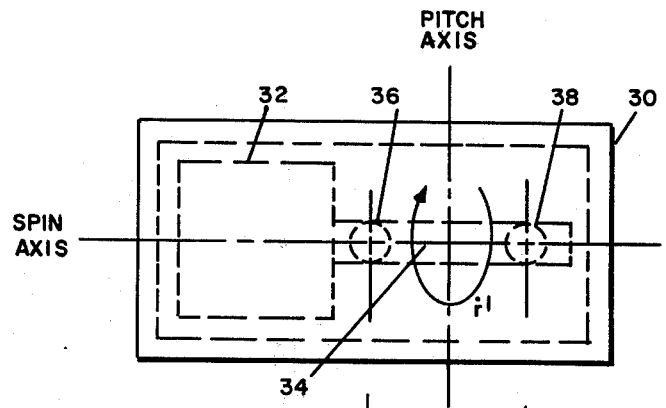
FIGS. 5A–5C are plan, top and side views, respectively, of apparatus for separately measuring translational and angular acceleration.
Figure 5A:
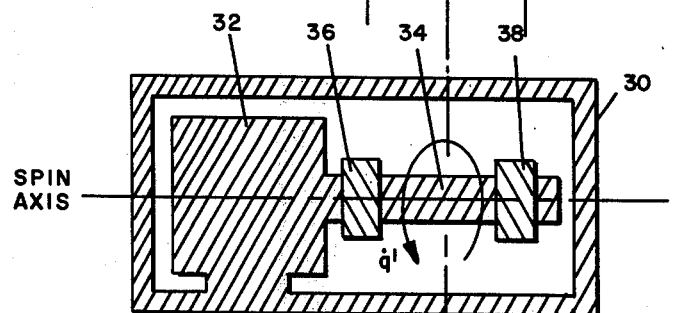
Figure 5C:
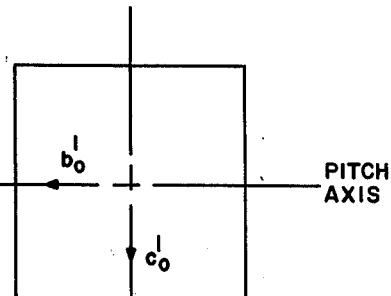

A common application of accelerometers is the measurement of translational and angular acceleration. These measurements can be accomplished by spinning translational acceleration transducers embodied in a device which is illustrated in FIGS. 5A–5C.

The device consists of a case 30 containing a spin-motor 32 and an extended axle 34 for mounting two transducers 36, 38 on the spin-axis. The transducers are mounted so that their sensitive axes are parallel to one another and normal to the spin-axis.

The primed coordinate frame is associated with the case and lines are inscribed on the case to indicate the location of the coordinate axes.

The unprimed coordinate frame is associated with the spin axis. The X-axis coincides with the spin axis and the X, Y and Z are mutually orthogonal.

The origins of the two coordinate frames aie coincident.

Transducers 36 and 38 are assigned the following coordinates:

| 38 | 36 |
|---|---|
| $x_2 = +x$ | $x_3 = -x$ |
| $y_2 = 0$ | $y_3 = 0$ |

-continued

| 38 | 36 | |
|---|---|---|
| $z_2 = 0$ | $z_3 = 0$ | (52) |

The transducers are oriented so that their sensitive axes are parallel to the Z-axis, thus, they measure $c_2$ and $c_3$.

The transducer output signals are $$c_2 = -b'_o \sin \phi + c'_o \cos \phi + x[-(p'q'+\dot{r}) \sin \phi + (p'r'-\dot{q}') \cos \phi]$$
$$c_3 = -b'_o \sin \phi + c'_o \sin \phi - x[-(p'q'+\dot{r}) \sin \phi + (p'r'-\dot{q}') \cos \phi] \quad (53)$$

Rearranging equations (53)

$$-b_o' \sin \phi + c_o' \cos \phi = \frac{c_3 + c_4}{2} \quad (54)$$

$$-(p'q' + \dot{r}) \sin \phi + (p'r' - \dot{q}') \cos \phi = \frac{c_3 - c_4}{2x} \quad (55)$$

Usually p', q', r' are small quantities whose products can be neglected. Neglecting p'q' and p'r' in (55) gives $$-\dot{r} \sin \phi - \dot{q}' \cos \phi = \frac{c_3 - c_4}{2x} \quad (56)$$

The magnitudes of $b'_o$, $c'_o$, $q'$, $r'$ can be sampled at appropriate magnitudes of $\sin \phi$ and $\cos \phi$, or by other signal processing techniques. Thus, a single instrument consisting of a case, a spin-motor and two translational acceleration transducers mounted on the spin-axis can provide measurements of the components of translational acceleration, $b'_o$ and $c'_o$, and of the components of angular acceleration, $\dot{q}'$ and $\dot{r}'$.

Figure 6:
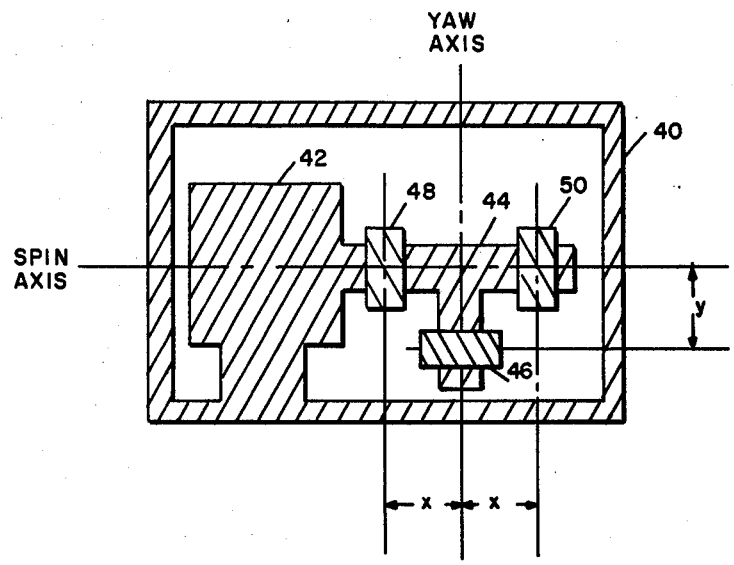
FIG. 6 is a cross-sectional view of apparatus for separately measuring translation acceleration, angular acceleration and angular velocity.

The two devices, illustrated in FIGS. 4 and 5, can be combined in a single device, which is illustrated in FIG. 6. This combined device provides p', q', $\dot{p}'$, $\dot{r}'$, $b'_o$, and $c'_o$. It also eliminates the approximation errors incorporated in the device illustrated in FIG. 4.

The combined device consists of a case 40, a spin-motor 42 and an extended axle 44 for mounting three transducers. One transducer 46 is mounted so that its sensitive axis is parallel to the spin axis. The other two transducers 48 and 50 are mounted so that their sensitive axes are parallel to one another and normal to the spin-axis. The sensitive axes of the three transducers are coplanar.

The primed coordinate frame is associated with the case and lines are inscribed on the case to indicate the location of the coordinate axes.

The unprimed coordinate frame is associated with the spin axis. The X-axis coincides with the spin axis and the X, Y and Z axes are mutually orthogonal.

Transducers 46, 48 and 50 are assigned the following coordinates:

| 46 | 50 | 48 |
|---|---|---|
| $x_1 = 0$ | $x_2 = x$ | $x_3 = -x$ |
| $y_1 = 0$ | $y_2 = 0$ | $y_3 = 0$ |
| $z_1 = z$ | $z_2 = 0$ | $z_3 = 0$ |

Transducer 46 is oriented so that it measures $a_1$. Transducers 50 and 48 are oriented so that they measure $c_2$ and $c_3$, respectively.

The transducer output signals are $$a_1 = a_o - z[(2p-p')q' - \dot{r}] \sin \phi + z[(2p-p')r' + \dot{q}'] \cos \phi \quad (57)$$

$$c_2 = b'_o \sin \phi + c'_o \cos \phi + x[-(p'q'+\dot{r}) \sin \phi + (p'r'-\dot{q}') \cos \phi] \quad (58)$$

$$c_3 = -b'_o \sin \phi + c'_o \cos \phi - x[-(p'q'+\dot{r}) \sin \phi + (p'r'-\dot{q}') \cos \phi] \quad (59)$$

All of the terms involve $\sin \phi$ and $\cos \phi$ except $a_o$, which can be suppressed by a high pass filter. The terms can be combined in the following manner $$-b_o' \sin \phi + c_o' \cos \phi = \frac{c_2 + c_3}{2}$$

$$-(p'q' + \dot{r}) \sin \phi + (p'r' - \dot{q}') \cos \phi = \frac{c_2 - c_3}{2x}$$

$$-[(2p - p')q' - \dot{r}] \sin \phi + [(2p - p')r' + \dot{q}'] \cos \phi = \frac{a_1}{z}$$

$$-q' \sin \phi + r' \cos \phi = \frac{1}{2p}\left[\frac{a_1}{z} + \frac{c_2 - c_3}{2x}\right]$$

and neglecting p'q' and p'r'

$$-\dot{r} \sin \phi - \dot{q}' \cos \phi = \frac{c_2 - c_3}{2x}$$

summarizing $$-b_o' \sin \phi + c_o' \cos \phi = \frac{c_2 + c_3}{2} \quad (60)$$

$$-\dot{r} \sin \phi - \dot{q}' \cos \phi = \frac{c_2 - c_3}{2x} \quad (61)$$

$$-q' \sin \phi + r' \cos \phi = \frac{1}{2p}\left[\frac{a_1}{z} + \frac{c_2 - c_3}{2x}\right] \quad (62)$$

The magnitudes of $b'_o$, $c'_o$, $\dot{q}'$, $\dot{r}'$, $q'$ and $r'$ can be sampled at appropriate magnitudes of $\sin \phi$ and $\cos \phi$, or by other signal processing techniques.

Thus, a single instrument consisting of a case, a spin motor and three translational acceleration transducers can provide measurements of $b'_o$ and $c'_o$: components of translational acceleration
$\dot{q}'$ and $\dot{r}'$: components of angular acceleration
$q'$ and $r'$: components of angular velocity The three devices illustrated by FIGS. 4, 5 and 6 are motion sensors of a rather general type. They incorporate measurements of angular velocity which heretofore have been accomplished by means of gyroscopes. The principles of the gyroscope and that of measuring angular velocity by means of transducers are both based on the same laws of acceleration.

The gyroscope and the transducer arrays described here are mathematically equivalent but they are physically different. The gyroscope depends on angular momentum, which is made large so that certain physical effects (such as those due to friction) are suppressed. The transducer scheme depends only on kinematic effects and the measurement of accelerations at one or more points.

The several schemes described above can be applied to spinning projectiles. The unprimed coordinate frame is associated with the body of the projectile and the transducers are mounted in the body. The body becomes the counterpart of the spinning coordinate frame in such application.

It is convenient to conceptualize a nonspinning (primed) coordinate frame, whose origin and X' axis coincide with the origin and X-axis of the unprimed frame. This primed coordinate frame has no physical counterpart, but it is a useful theoretical construct. It has the further advantage of being consistent with the theory already presented.

Two modifications of the schemes which have been described are required for applications in spinning projectiles. These are:

(1) The spin-rate of the projectile must be measured in order to evaluate q' and r' from 2pq' and 2pr'.

Figure 7:
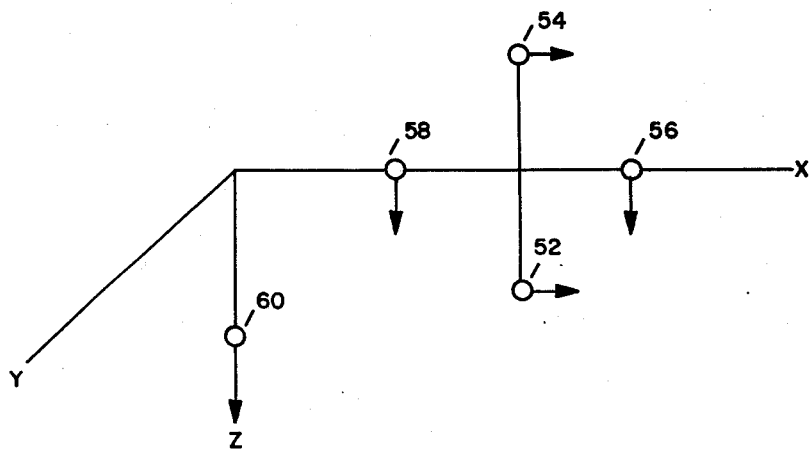
FIG. 7 is an illustration of an embodiment of the invention wherein translational acceleration transducers are used in a spinning projectile to provide angular rate measurements in pitch and yaw.

(2) Certain precautions may be required in order to compensate for uncertainties in the location of the spin axis. These modifications can be incorporated in a scheme which employs five accelerometers. This scheme is illustrated in FIG. 7.

Five accelerometers 52, 54, 56, 58 and 60 are mounted on a spinning projectile such as that described in U.S. Patent application Ser. No. 392,716 filed Aug. 10, 1973 and assigned to the assignee of the present application. In that application a gun-fired guided projectile is described which requires a rate sensor to measure pitch and yaw. Conventional gyroscopes are unsatisfactory in that in addition to being large, they are difficult to gun harden. Since the projectile itself is spinning, it acts as the spin motor of the earlier described embodiments. The transducers are assigned the following coordinates and orientations.

| Accelerometer Number | x | y | z | Orientation |
|---|---|---|---|---|
| 52 | 0 | 0 | $z_1$ | a |
| 54 | 0 | 0 | $z_2$ | a |
| 56 | x | 0 | 0 | c |
| 58 | −x | 0 | 0 | c |
| 60 | 0 | 0 | z | c |

The transducer output signals are $a_1 = z_1[-(2pq'-\dot{r}')\sin\phi + (2pr'+\dot{q}')\cos\phi]$ $a_2 = z_2[-(2pq'-\dot{r}')\sin\phi + (2pr'+\dot{q}')\cos\phi]$
$c_3 = -b'_o\sin\phi + c'_o\cos\phi + x(-\dot{r}'\sin\phi - \dot{q}'\cos\phi)$
$c_4 = -b'_o\sin\phi + c'_o\cos\phi - x(-\dot{r}'\sin\phi - \dot{q}'\cos\phi)$ $$c_5 = -z\frac{(p^2 + q'^2 + r'^2)}{2} \approx -zp^2$$

These signals can be combined yielding the following results.

$$-b_o'\sin\phi + c_o'\cos\phi = \frac{c_3 + c_4}{2} \quad (63)$$

$$-\dot{q}'\cos\phi - \dot{r}'\sin\phi = \frac{c_3 - c_4}{2x} \quad (64)$$

$$-q'\sin\phi + r'\cos\phi = \frac{1}{2p}\left(\frac{a_1-a_2}{z_1-z_2} + \frac{c_3-c_4}{2x}\right) \quad (65)$$

$$p = \sqrt{\frac{c_5}{-z}} \quad (66)$$

In such an application the sign of p is known and only the magnitude needs be determined.

It should be noted that in equation (65) the difference, $z_1 - z_2$ must be known, rather than either coordinate separately. Thus, the measurement of angular velocity does not depend on an accurate knowledge of the location of the spin axis.

Transducer 60 can be detected if the spin rate is known or can be measured by other means.

While I have described above the principles of my invention in connection with specific apparatus, it is to be clearly understood that this description is made only by way of example and not as a limitation of the scope of my invention as set forth in the accompanying claims.

I claim:

1. Apparatus for generating precise translational accelerations (a) at a point by means of simultaneous rotations about two orthogonal axes, comprising:
   a first support;
   first means for rotating said support about a first axis at a constant angular velocity (r');
   a second support;
   second means for rotating said second support about a second axis orthogonal to said first axis at a constant angular velocity (p);
   a translational acceleration transducer mounted at a point lying on an axis separated from said second axis by a distance (z) parallel to said second axis but not coincident therewith, said transducer outputting a signal, representing translational acceleration (a), which is a sinusoid the amplitude of which is 2pr'z and the frequency of which is p/2π when said first and second rotating means are rotated at r' and p, respectively; and
   means for mounting said second rotation means on said first support.

2. Apparatus as defined in claim 1 wherein said first and second means for rotating are first and second motors, respectively.

3. Apparatus as defined in claim 2 wherein said second motor has a shaft with said second support fixed to said shaft for rotation therewith.

4. Apparatus as defined in claim 1, further including means for tilting the apparatus, including said first and second means for rotating said first support, said second support and said means for mounting, about a third axis orthogonal to said first axes.

5. Apparatus as defined in claim 1 wherein said translational acceleration transducer is mounted with the sensitive axis thereof parallel to said second axis.

6. Apparatus for calibrating translational acceleration transducers, comprising:
   a translational acceleration transducer;
   first means for rotating said translational acceleration transducer about a first axis;
   second means for rotating said transducer about a second axis orthogonal to said first axes; and
   means for mounting said transducer on an axis parallel to said second axis but not coincident therewith.

7. Apparatus as defined in claim 6, further including:
   a turntable coupled to said first means for rotating for rotation thereby;
   a face-plate coupled to said second means for rotating for rotation thereby;
   first means for mounting the transducer on said face-plate; and
   second means for mounting said second means for rotating on said turntable.

8. Apparatus as defined in claim 7, wherein said first means for mounting includes means for mounting the transducer on said face-plate at a fixed distance from said second axis with the sensitive axis of the transducer parallel to said second axis.

9. Apparatus as defined in claim 7 further including means for mounting a plurality of transducers on said face-plate whereby an array of translational acceleration transducers can be calibrated.

10. Apparatus as defined in claim 6 wherein said mounting means includes means for mounting the translational acceleration transducers with the sensitive axis thereof parallel to said second axis.

11. Apparatus for measuring angular velocity about two axes, comprising:
only a single support having an axis of rotation which is orthogonal to the two axes;
a translational acceleration transducer rigidly mounted on said support at a point at a fixed distance from said axis of rotation so as to measure acceleration at that point; and
means for rotating said transducer about said axis of rotation, the output signal from said transducer providing approximate measures of angular velocity about said two axes.

12. Apparatus as defined in claim 11, further including a case having said transducer and said means for rotating contained therein and said means for rotating fixed thereto.

13. Apparatus as defined in claim 12 wherein said means for rotating includes a motor, said support including a face-plate coupled to the shaft of said motor, said transducer being arranged on said face-plate.

14. Apparatus as defined in claim 13 wherein said transducer is mounted on said face-plate at a fixed distance from the rotational axis of said motor with the sensitive axis of said transducer parallel to the rotational axis of said motor.

15. Apparatus as defined in claim 11 wherein said translational acceleration transducer is mounted with the sensitive axis thereof parallel to said axis of rotation.

16. Apparatus for measuring translational acceleration in two orthogonal directions and angular acceleration about these directions, comprising:
means for providing rotation about an axis orthogonal to the two orthogonal directions;
an array of at least two translational acceleration transducers rigidly arranged on two points on said axis with the sensitive axes of the transducers orthogonal to said axis so as to measure acceleration at these points; and
means coupling said array of transducers to said means for rotating.

17. Apparatus as defined in claim 16 wherein said means for rotating includes a motor having a shaft, said transducers being arranged on said shaft.

18. Apparatus as defined in claim 16, further including a case having said means for rotating and said array disposed therein, said means for rotating being fixed to said case.

19. Apparatus for measuring angular velocity, angular acceleration and translational acceleration for two axes, comprising:
a support;
means for providing rotation to said support about an axis orthogonal to the two axes;
at least three translational acceleration transducers disposed relative to said axis, one of said transducers being rigidly mounted on said support at a point at a predetermined distance from said axis with its sensitive axis parallel to said axis so as to measure accelerations at that point, the other two of said transducers located on said axis with the sensitive axes of the transducers orthogonal to said axis.

20. Apparatus as defined in claim 19, wherein said means for rotating includes a motor having a shaft, said other said transducers being arranged on the axis of said shaft.

21. Apparatus as defined in claim 19, further including a case having said means for rotating and said array disposed therein, said means for rotating fixed to said case.

22. Apparatus for making inertial measurements, comprising:
only a single assembly;
means for rotating said assembly; and
at least one transducer rigidly mounted on said assembly at a point at a predetermined location with respect to the axis of rotation of said means for rotating so as to measure accelerations at that point and having the sensitive axis of the transducer parallel but not coincident with respect to the axis of rotation of said means for rotating.

23. Apparatus for measuring angular velocity of a body spinning with an angular velocity (p) about two axes which are orthogonal to the spin axis of the body, comprising:
a translation acceleration transducer mounted at a point lying on the spinning body at a coordinate (z) and having an output (a) which is substantially equal to 2pz $(-q' \sin \phi + r' \cos \phi)$,
wherein
$r'$ = angular velocity about one axis (yaw),
$q'$ = angular velocity about the second of the two axes (pitch),
$\phi$ = relative angle between the spinning body and the coordinate frame on which $q'$ and $r'$ are resolved.

24. Apparatus as defined in claim 23 wherein said transducer is mounted on the spinning body at a predetermined distance from the spin axis thereof and with the sensitive axis of said transducer parallel to the spin axis of the spinning body.

25. Apparatus as defined in claim 24, further including means for measuring the spin rate of the spinning body.

26. Apparatus for measuring translational acceleration in two orthogonal directions and angular acceleration about these directions on a spinning body wherein the directions are orthogonal to the spin axis of the spinning body, comprising:
an array of at least two translational acceleration transducers arranged on the spin axis of the spinning body with the sensitive axes of the transducers orthogonal to the spin axis of the spinning body; and
means for mounting said transducers on the spinning body.

27. Apparatus for measuring angular velocity, angular acceleration and translational acceleration about two axes of a spinning body which axes are orthogonal to the spin axis of the body, comprising:
at least three translational acceleration transducers disposed relative to the spin axis, one of said transducers being arranged at a predetermined distance from the spin axis of the spinning body with its sensitive axis parallel to the spin axis, the other two of said transducers located on said spin axis with the sensitive axis of the transducer orthogonal to the spin axis; and
means for mounting said transducers on the spinning body.

28. Apparatus as defined in claim 27, further including means for measuring the spin rate of the spinning body.

29. Apparatus for measuring angular velocity, angular acceleration and translational acceleration for two axes of a spinning body, which axes are orthogonal to the spin axes of such spinning body, comprising:
- at least four translational acceleration transducers disposed relative to the spin axis of the spinning body, two of said transducers located on the spin axis of the spinning body with the sensitive axis of the transducers orthogonal to the spin axis and the other two transducers arranged about the spin axis and with the sensitive axis thereof parallel to the spin axis; and
- means for mounting said translational acceleration transducers.

30. Apparatus as defined in claim 29, further including means for measuring the spin rate of the spinning body.

31. Apparatus for making inertial measurements on a spinning body, comprising:
- at least one translational acceleration transducer mounted with respect to the spin axis of the spinning body and having the sensitive axis of the transducer substantially parallel but not coincident with respect to the spin axis of the spinning body.

32. Apparatus as defined in claim 22 wherein said transducer is a translational acceleration transducer.

33. Apparatus as defined in claim 29 wherein said translational acceleration transducer is mounted such that the sensitive axis of said transducer is parallel but not coincident with said spin axis.

34. Apparatus as defined in claim 11 wherein said translational acceleration transducer is mounted such that the sensitive axis of said transducer is parallel but not coincident with said axis of rotation.

35. A method for generating translational accelerations at a point, comprising the steps of:
- providing a translational acceleration transducer at a point;
- orienting said transducer such that the sensitive axis thereof is substantially parallel to a first axis and displaced from said first axis by a distance;
- rotating said translational acceleration transducer about a second axis orthogonal to said first axis at a constant angular velocity; and
- rotating said translational acceleration transducer at a constant angular velocity (p) about said first axis, the translational accelerations (a) generated at said point is a sinusoid the amplitude of which is 2pr'z and the frequency of which is p/2π.

36. A method for calibrating translational acceleration transducers, comprising the steps of:
- providing the translational acceleration transducer;
- orienting the transducer such that the sensitive axis thereof is substantially parallel to a first axis and displaced therefrom;
- rotating the transducer about a second axis orthogonal to said first axis; and
- rotating the transducer about said first axis.

37. A method for measuring angular velocity about two axex, comprising the steps of:
- providing a support;
- providing a translational acceleration transducer;
- rigidly mounting said transducer on said support at a point such that the sensitive axis thereof is substantially parallel to a third axis orthogonal to the two axes and displaced from said third axis so as to measure accelerations at that point; and
- rotating the translational acceleration transducer about said third axis, the output of the transducer being a measure of the angular velocity about the two axes.

38. A method for measuring translational acceleration in two orthogonal directions and angular acceleration about these directions, comprising the steps of:
- rigidly mounting an array of at least two translational acceleration transducers on two points on an axis with the sensitive axis of the transducers orthogonal to the axis so as to measure acceleration at these points; and
- rotating the array of translational acceleration transducers about said axis, whereby the outputs of the transducers is a measure of the two translational accelerations and the two angular accelerations.

39. A method for measuring angular velocity, angular acceleration and translational acceleration for two axes, comprising the steps of:
- providing three translational acceleration transducers disposed relative to a third axis such that one of the transducers is rigidly mounted at a predetermined distance from the third axis with its sensitive axis parallel to the third axis and with the other two of the transducers being located on the third axis with the sensitive axis of the transducers orthogonal to the third axis; and
- rotating the three dimensional acceleration transducers about the third axis, whereby the outputs of the transducers is a measure of the angular ten velocity, angular accelerations and translational accelerations.

* * * * *